United States Patent [19]
Schleuder

[11] Patent Number: 6,053,072
[45] Date of Patent: Apr. 25, 2000

[54] MODULAR HOUSING FOR VEHICULAR POWER TRANSFER DEVICES

[75] Inventor: Carl D. Schleuder, Novi, Mich.

[73] Assignee: New Venture Gear, Inc., Troy, Mich.

[21] Appl. No.: 09/220,485

[22] Filed: Dec. 23, 1998

Related U.S. Application Data

[60] Provisional application No. 60/071,166, Jan. 12, 1998.

[51] Int. Cl.[7] .................................................. F16H 57/02
[52] U.S. Cl. ............................................................ 74/606 R
[58] Field of Search ................................. 74/606 R, 607; D15/149

[56] References Cited

U.S. PATENT DOCUMENTS

| | | |
|---|---|---|
| 4,434,606 | 3/1984 | Rhodes et al. . |
| 4,782,719 | 11/1988 | Yarnell . |
| 5,146,748 | 9/1992 | Okada . |
| 5,156,576 | 10/1992 | Johnson . |
| 5,207,121 | 5/1993 | Bien . |
| 5,836,219 | 11/1998 | Klingler et al. . |

FOREIGN PATENT DOCUMENTS

| | | |
|---|---|---|
| 0543731 | 5/1993 | European Pat. Off. . |
| 3815511 | 11/1989 | Germany . |

*Primary Examiner*—Mary Ann Battista
*Attorney, Agent, or Firm*—Harness, Dickey & Pierce, P.L.C.

[57] ABSTRACT

A power transfer device for a motor vehicle having a modular housing assembly which supports a geartrain. A first embodiment of the modular housing assembly includes a case having unitary sidewall with terminal edges defining two opposed openings. The sidewall also defines an interior chamber and the openings are enclosed by a pair of cover plates. Pillow blocks are used to support the drive components of the geartrain within the chamber and are secured to shelves which extend from the sidewall. Loads created during operation are transmitted from the geartrain to the sidewall. The cover plates are secured to the terminal edges of the sidewall using a plurality of U-shaped spring clamps. A second embodiment of the modular housing assembly includes a box-like case having one open side. A cover plate is used to enclose the geartrain and lubrication fluid within the interior volume of the box-like case. The cover plate is secured to a flange extending from the box-like case with a plurality of U-shaped spring clamps. A continuous support shelf is formed from the base of the box-like case and allow loads to be transmitted directly to the box-like case.

39 Claims, 8 Drawing Sheets

MODULAR HOUSING FOR VEHICULAR POWER TRANSFER DEVICES

This application claims priority from Provisional Application number 60/071,166, filed Jan. 12, 1998.

FIELD OF THE INVENTION

The present invention relates to a modular housing and assembly methods for power transfer devices of the type used in motor vehicles.

BACKGROUND OF THE INVENTION

As is widely known, automobile manufacturers desire the flexibility to offer a variety of drivetrain packages with different power transmission characteristics (i.e., number of gear ratios, torque capacity, 2WD/4WD, etc.) for each vehicle. This flexibility is limited, however, by the significant cost and leadtime required to design and validate a series of different power transfer devices (i.e., transfer cases, transmissions, transaxles, axle assemblies, etc.). This dilemma is further aggravated by the competitive need to develop lighter weight and higher efficiency power transfer devices at a reduced cost.

A significant amount of the weight and manufacturing cost associated with traditional power transfer devices is derived from the housing. Typically, the housing is assembled from two or more bell-shaped castings that are interconnected to form an enclosed chamber within which a geartrain is supported. Additionally, the various rotary components (i.e., shafts, gears, carriers, etc.) of the geartrain extend through and/or are rotatably supported by one or more of the castings. As such, each casting must be constructed from a material having sufficient strength and thickness to absorb the loads created during power transmission while providing acceptable noise isolation and heat transfer characteristics. Consequently, most housings are designed for use with a single power transfer device. Hence, increased costs are incurred when a variety of drivetrain packages are offered to the consumer.

Another disadvantage associated with conventional housings is the secondary machining required to permit the castings and the drive components of the geartrain to be properly aligned during assembly. For example, since threaded fasteners are used to rigidly connect the castings, the flatness of the mounting face on the rim of each casting and the location of threaded holes therein are critical to proper alignment and sealing of the power transfer device.

SUMMARY OF THE INVENTION

It is therefore desirable to provide a power transfer device with a modular housing assembly which, when compared to traditional housings, increases assembly precision while concomitantly decreasing cost.

According to a first embodiment of the present invention, a power transfer device is provided with a modular housing assembly having a center case and a pair of cover plates which are secured to the center case to define an enclosed chamber. The center case includes a continuous sidewall which is open on two opposing sides to define a pair of openings. The cover plates are mounted to the center case and enclose its openings. Mounting shelves extend inwardly from the sidewall of the center case and are adapted to align and support mounting devices for carrying both the rotary and non-rotary components of a geartrain. The mounting shelves are designed to transfer the loads transmitted by the components of the geartrain to the sidewall of the center case. All of the mounting shelves may have a mounting surface located in a common plane. Such an arrangement simplifies the machining, inspection, and assembly time required to build a power transfer device. Moreover, the location of the mounting shelves may be commonized to permit different power transfer devices to be assembled using a single center case. As such, the modularity of the center case and the cover plates, in combination with the design flexibility afforded by the mounting shelves, will provide simplified assembly operations with higher precision alignment of the geartrain components.

According to another embodiment of the present invention, a power transfer device is provided with a modular housing assembly comprised of a box-like center case and a single cover plate. The center case includes a continuous sidewall segment and an integral base segment which together form an interior chamber which is enclosed by the cover plate.

In association with either embodiment, the cover plate includes a peripheral flange that is adapted to be mounted on a peripheral rim of the center case adjacent its opening. Thereafter, the cover plate is secured to the center case by a set of spring clamps. The spring clamps are spaced for achieving a relatively constant load between the mating cover plate flange and the center case rim, thereby achieving a fluid-tight seal. The cover plates are not required to perform the traditional functions of locating and supporting the geartrain components and, as such, do not function to absorb or carry any loads from the geartrain. Instead, each cover plate encloses the opening of the center case for sealing a supply of lubricating fluid within the modular housing assembly. Preferably, the cover plates are manufactured from a stiff, yet lightweight material which, for example, can be a molded composite or stamped steel component.

Employing the above embodiments of the present invention, a power transfer device having a lightweight, yet robust, modular housing assembly can be used in a variety of power transmission applications. Additionally, the present invention reduces the manufacturing time and cost by improving tolerance capabilities for aligning the drive components of the power transfer device.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings in which.

DETAILED DESCRIPTION OF THE PREFERRED EMBODIMENTS

Figure 1:
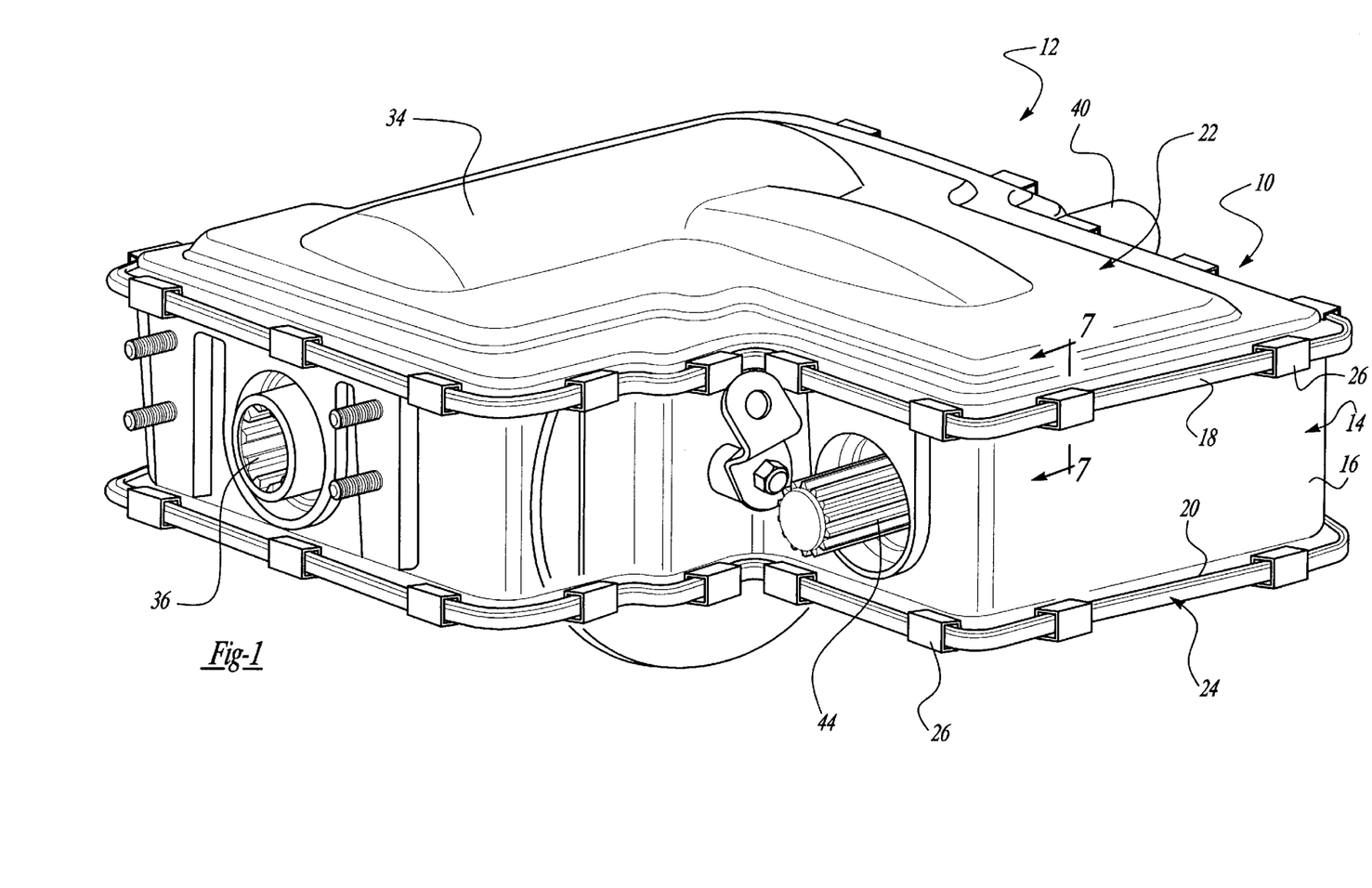
FIG. 1 is a perspective view of an exemplary power transfer device having a modular housing assembly according to a first embodiment of the present invention.

Referring initially to FIG. 1, a modular housing assembly 10 for a power transfer device of the type used in the drivetrain of a motor vehicle is shown. The power transfer device can be any component of the vehicle's drivetrain (i.e., RWD transmission, FWD transaxle, 4WD transfer case, differential, drive axle, etc.) in which housing assembly 10 is used for supporting a geartrain in a sump of lubricating fluid. In the exemplary embodiment shown, the power transfer device is a four-wheel drive transfer case 12. Housing assembly 10 includes a center case 14 having a continuous sidewall 16 with opposite terminal edges defining a pair of openings. Center case 14 further includes a first or upper peripheral rim 18 and a second or lower peripheral rim 20 which extend outwardly from the terminal edges of sidewall 16. In this manner, center case 14 defines an interior open volume that is open on two opposing sides. While not limited thereto, center case 14 is preferably cast from aluminum or magnesium. Housing assembly 10 further includes a first or upper cover plate 22 and a second or lower cover plate 24 which are respectively secured to upper rim 18 and lower rim 20 of center case 14 by a plurality of fasteners, such as spring clamps 26, to define a sealed interior chamber 28.

Figure 2:
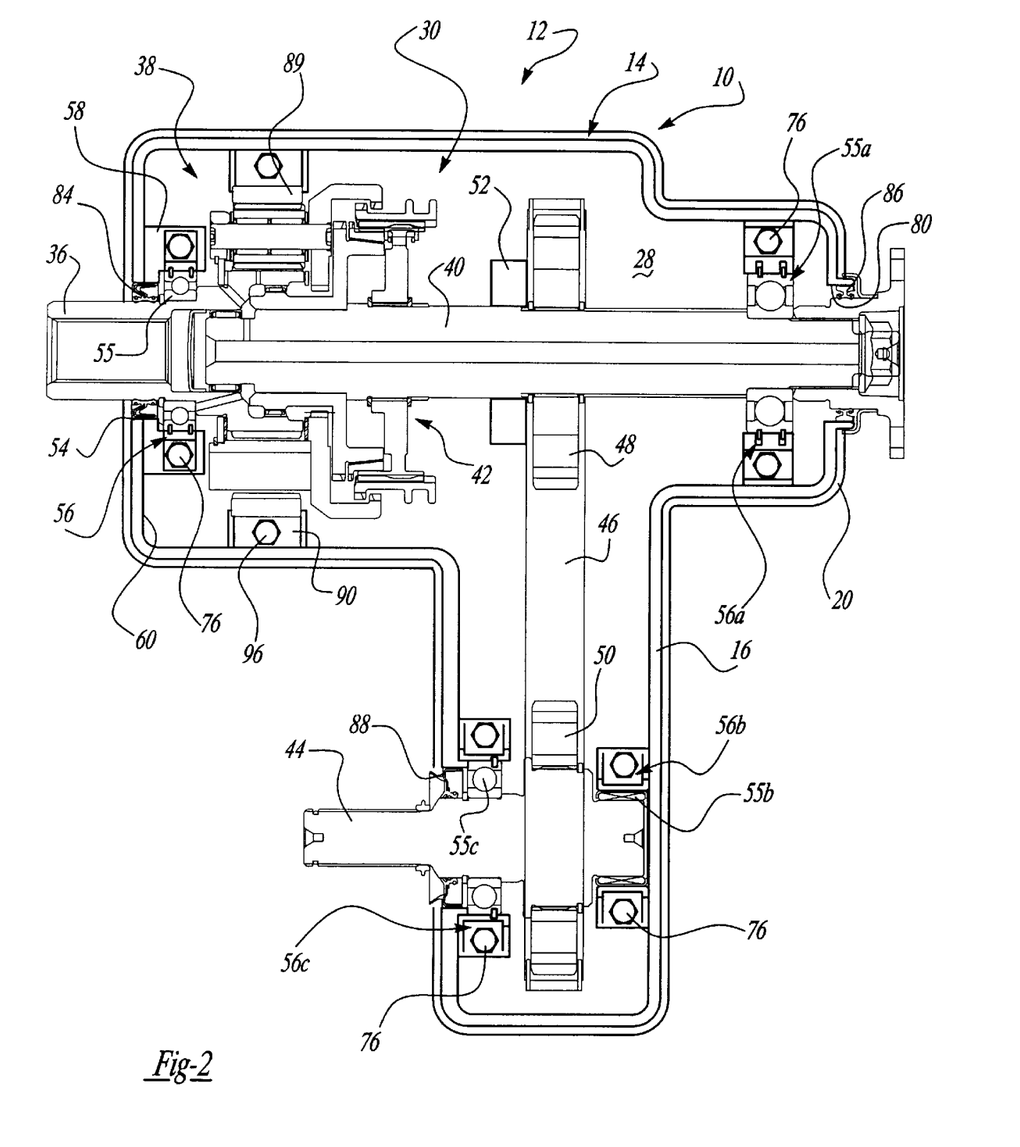
FIG. 2 is a longitudinal sectional view of the power transfer device showing a conventional geartrain mounted in the housing assembly.

Referring to FIG. 2, housing assembly 10 is shown with cover plates 22 and 24 removed to reveal an exemplary power transmission geartrain 30 supported from center case 14. In general, exemplary power transmission geartrain 30 is similar to that shown in the four-wheel drive transfer case disclosed in commonly-owned U.S. Pat. No. 5,346,442. In this regard, geartrain 30 includes an input shaft 36, a two-speed planetary gearset 38, a rear output shaft 40, a range clutch 42, a front output shaft 44, a drive chain 46 connecting a drive sprocket 48 rotatably supported on rear output shaft 40 to a driven sprocket 50 fixed to front output shaft 44, and a mode clutch shown by block 52. However, the specific componentry of geartrain 30 is not critical to the present invention since geartrain 30 represents any combination of components which are mounted and sealed in interior chamber 28 of housing assembly 10 when upper cover plate 22 and lower cover plate 24 are secured to center case 14.

Cover plates 22 and 24 are adapted to control noise, vibration, and harshness and are preferably manufactured as steel stampings or molded polymeric composites, or, in the alternative, may be fabricated from any other stiff, lightweight, corrosion resistant material. More preferably, cover plates 22 and 24 are net formed so as to require minimal, if any, secondary machining operations. Cover plates 22 and 24 include a plurality of variably sized transition segments, an example of which is identified by reference numeral 34, which provide clearances for the components of geartrain 30 and/or improve noise isolation and rigidity. With the above disclosure in mind, it should be understood that upper cover plate 22 and lower cover plate 24 do not locate and/or carrying loads developed by geartrain 30. Rather, upper cover plate 22 and lower cover plate 24 simply enclose and seal geartrain 30 and a supply of lubricating fluid within interior chamber 28 of center case 14. This arrangement allows the use of cover plates 22 and 24 to significantly reduce the overall weight and cost of housing assembly 10.

In accordance with the present invention, means are provided for supporting the various components of geartrain 30 from sidewall 16 of center case 14. In particular, input shaft 36 is shown to extend through an aperture 54 in sidewall 16 and is rotatably supported by a bearing assembly 55. Bearing assembly 55 is mounted in a pillow block 56 which, in turn, is rigidly secured to a platform-type shelf member 58 extending into chamber 28 from an interior wall surface 60 of sidewall 16. As seen from FIG. 4, shelf 58 is cantilevered from sidewall 16 and is integrally formed therewith or, in the alternative, may be welded thereto. To provide additional rigidity, if required, optional reinforcement webs 62 may extend between an underside surface 63 of shelf 58 and inner surface 60 of sidewall 16.

Figures 3, 4:
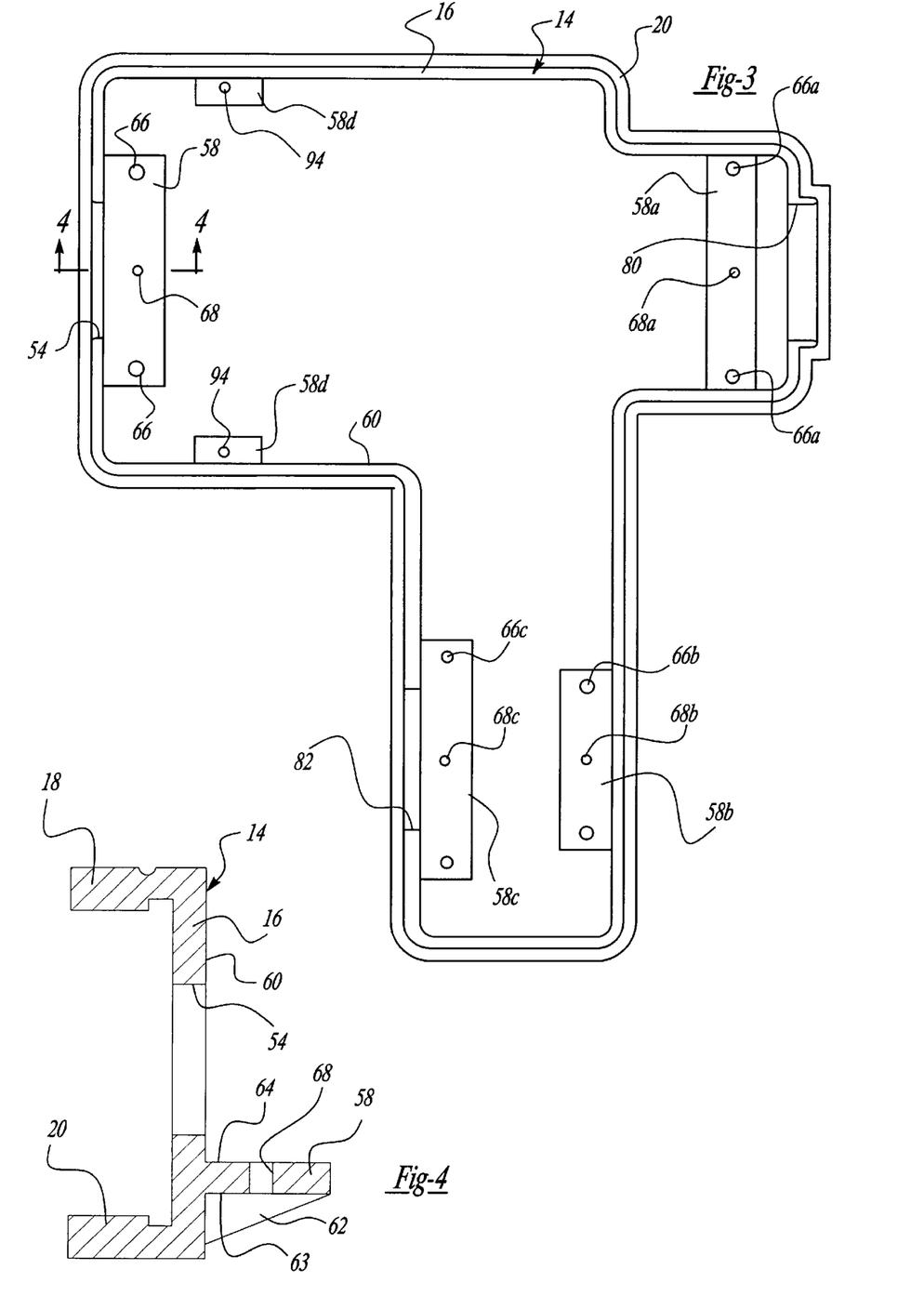
FIG. 3 is side view of the center case associated with the housing assembly.
FIG. 4 is a sectional view taken generally along line 4—4 of FIG. 3.

An upper surface 64 of shelf 58 is planar and, as best seen from FIG. 3, is formed to include a pair of threaded apertures 66 and an alignment bore 68. From FIG. 5, pillow block 56 is shown to include a mounting pad 70 with a planar underside surface 72 that is adapted to rest upon upper surface 64 of shelf 58. Mounting pad 70 has a pair of mounting apertures 74 which are alignable with apertures 66 in shelf 58 for receipt of threaded fasteners 76 therein. In this manner, pillow block 56 is rigidly secured to shelf 58, thereby rotatably supporting input shaft 36 from center case 14. A dowel pin (not shown) extending from underside surface 72 of pillow block mounting pad 70 is adapted to be received in alignment bore 68 in shelf 58 to accurately align pillow block 56 with respect to shelf 58. As an alternative, a keyway can be formed in shelf 58 for receipt of a key extending from pillow block mounting pad 70.

In line with the above disclosure, center case 14 is shown to include additional shelves that are generally similar to shelf 58 and which permit precision alignment and mounting of other mounting devices such as, for example, additional pillow blocks, for supporting the remaining components of geartrain 30. For example, shelf 58a is shown in FIG. 3 to extend across center case 14 for permitting a pillow block 56a (FIG. 2) to be located and mounted thereto. Alternatively, shelf 58a could extend from sidewall 16 of center case 14 in a manner similar to shelf 58. With either arrangement, shelf 58a includes threaded apertures 66a and dowel bore 68a for mounting a pillow block 56a thereon. A bearing assembly 55a is mounted in pillow block 56a for rotatably supporting an end portion of rear output shaft 40 which extends through an aperture 80 in sidewall 16 of center case 14. As a further alternative, shelf 58a could be bifurcated to define a pair of shelves that extend inwardly from opposing sides of center case 14.

Center case 14 also includes shelves 58b and 58c that are provided to respectively align and secure pillow blocks 56b and 56c to center case 14. Bearing assembles 55b and 55c mounted in pillow blocks 56b and 56c, respectively, rotatably support front output shaft 44 which extends through an aperture 82 in sidewall 16 of center case 14. Again, corresponding threaded apertures 66b, 66c and alignment apertures 68b, 68c are provided. As is conventional, rotary seals 84, 86 and 88 are provided to prevent lubricating fluid within chamber 28 from escaping through apertures 54, 80 and 82, respectively. It will be understood that shelves 58a, 58b and 58c are similar in structure and function to that previously detailed in the description provided for shelf 58, with the suffixes generally indicating such commonality. Moreover, the upper mounting surface 64 for each shelf is preferably arranged in a common plane which, when used in conjunction with pillow blocks 56 having commonized mounting pad dimensions, will minimize and simplify machining and assembly operations. In addition to simplified assembly, the shelves are designed to transfer loading from geartrain 30 to center case 14.

Figures 6, 7:
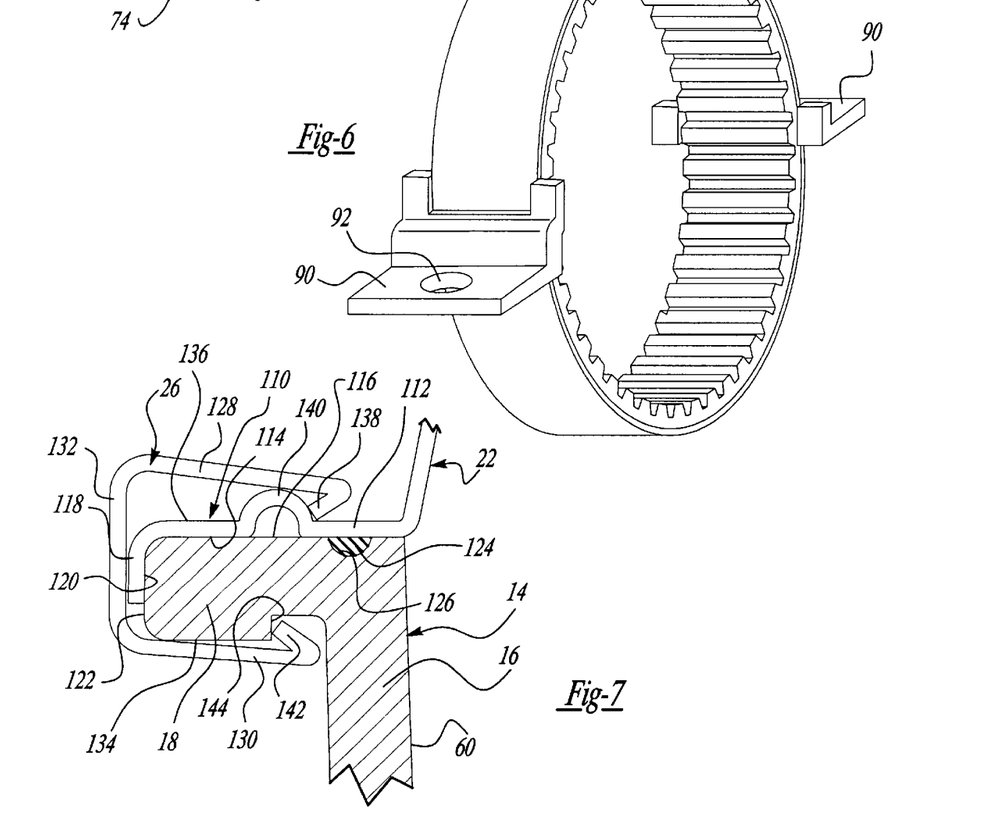
FIG. 6 is a perspective view of a mounting device used for supporting a non-rotary component of the geartrain and which is adapted to be mounted to the center case.
FIG. 7 is a partial sectional view taken generally along line 7—7 of FIG. 1 showing the spring clamp attachment between the center case and the cover plates.

Referring to FIGS. 2, 3 and 6, a direct mounting device is shown for securing a non-rotating component, such as an annular ring gear 89 of planetary gearset 38, to sidewall 16 of center case 14. In particular, a pair of mounting brackets 90 are non-rotatably fixed (i.e., keyed) to the opposite peripheral edges of ring gear 89 and each has a mounting aperture 92 formed therein. A pair of opposing shelves 58d extend from sidewall 16 and have a threaded aperture 94 formed therein that are alignable with mounting apertures 92 in mounting brackets 90. Once apertures 92 and 94 are aligned, threaded fasteners 96 are driven therethrough, thereby fixedly securing ring gear 89 to center case 14.

Figure 5:
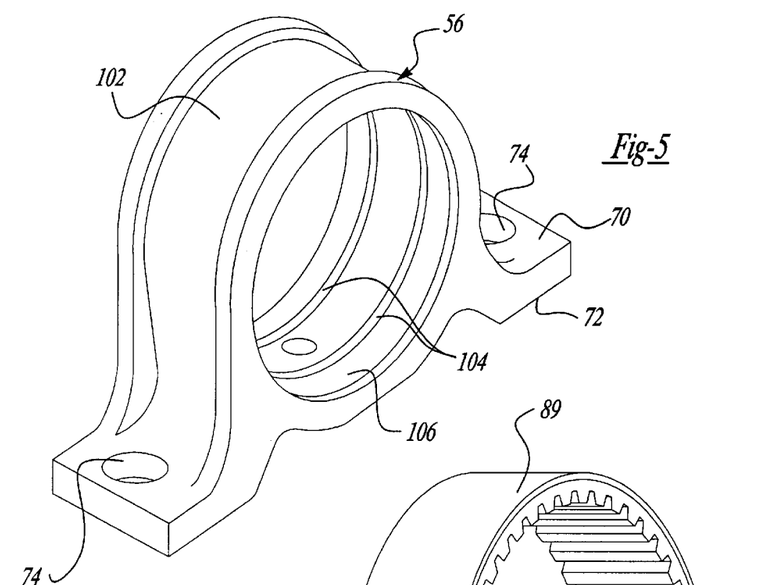
FIG. 5 is a perspective view of a mounting device used for supporting a rotary component of the geartrain and which is adapted to be mounted to the center case.

As seen in FIG. 5, in addition to mounting pad 70, pillow block 56 includes a hollow cylindrical drum 102 with a pair of grooves 104 formed in its inner surface 106 for receiving snap rings so as to axially retain bearing assembly 55 therein. The use of pillow blocks as described above, allows for simplified fabrication and machining of center case 14 as well as simplify assembly and inspection of geartrain 30 therein. The use of snap rings to retain the bearing assemblies in the pillow blocks improves the assembly process by allowing an entire geartrain 30, including the shafts, pillow blocks, bearings and drive components to be pre-assembled and placed into center case 14 at one time. Furthermore, employing this technique allows automated assembly of the power transfer devices 12 so as to increase productivity and decrease costs.

Referring now to FIG. 7, an arrangement for sealing cover plates 22 and 24 to center case 14 using a set of spring clamps 26 is described. In accordance with the present embodiment, the method used for securing upper cover plate 22 to upper rim 18 is identical to that used to secure lower cover plate 24 to lower rim 20. Accordingly, for clarity of disclosure, only the method and arrangement for sealing upper cover plate 22 to upper rim 18 will be discussed. As seen, cover plate 22 has a peripheral edge flange 110 which, when installed on center case 14, is adapted to mate with and overhang rim 18. In particular, flange 110 includes a first segment 112 having an underside surface 114 that is adapted to matingly engage a top surface 116 of rim 18. Edge flange 110 also includes a second segment 118 which is angled relative to first segment 112 and which is adapted to overhang rim 18. Second segment 118 includes an underside surface 120 that is adapted to engage an edge surface 122 of rim 18. A seal element 124 is shown retained in a groove 126 formed in top surface 116 of rim 18 for establishing a fluid-tight seal between cover plate 22 and center case rim 18 when spring clamps 26 are installed.

Each spring clamp 26 is U-shaped and includes a pair of legs 128 and 130 extending transversely from a base segment 132. Spring clamps 26 are installed when edge flange 110 of cover plate 22 is mounted onto rim 18 of center case 14. In particular, spring clamps 26 are installed such that leg 130 is biased into engagement with an underside surface 134 of rim 18 while leg 128 is biased into engagement with an outer surface 136 of first segment 112 of flange 110. Leg 128 of spring clamp 26 has a bent-over lip 138 that is adapted to forcibly engage a continuous projection 140 formed in first segment 112 of flange 110. Likewise, leg 130 has a bent-over lip 142 that is adapted to engage a recessed shoulder surface 144 formed by a groove in underside 134 of rim 18. As spring clamps 26 compress cover plate 22 to rim 18, seal element 124 deforms to create a dedicated sealing joint, thereby enclosing the lubricating fluid within interior chamber 28 of modular housing assembly 10. This dedicated sealing joint is an improvement over the traditional method in that it is only exposed to the loads created by spring clamps 26, rather than the loads created by the drive components. Optionally, a second seal element may be installed within projection 140 to arrangement the sealing characteristics.

Figures 8, 10:
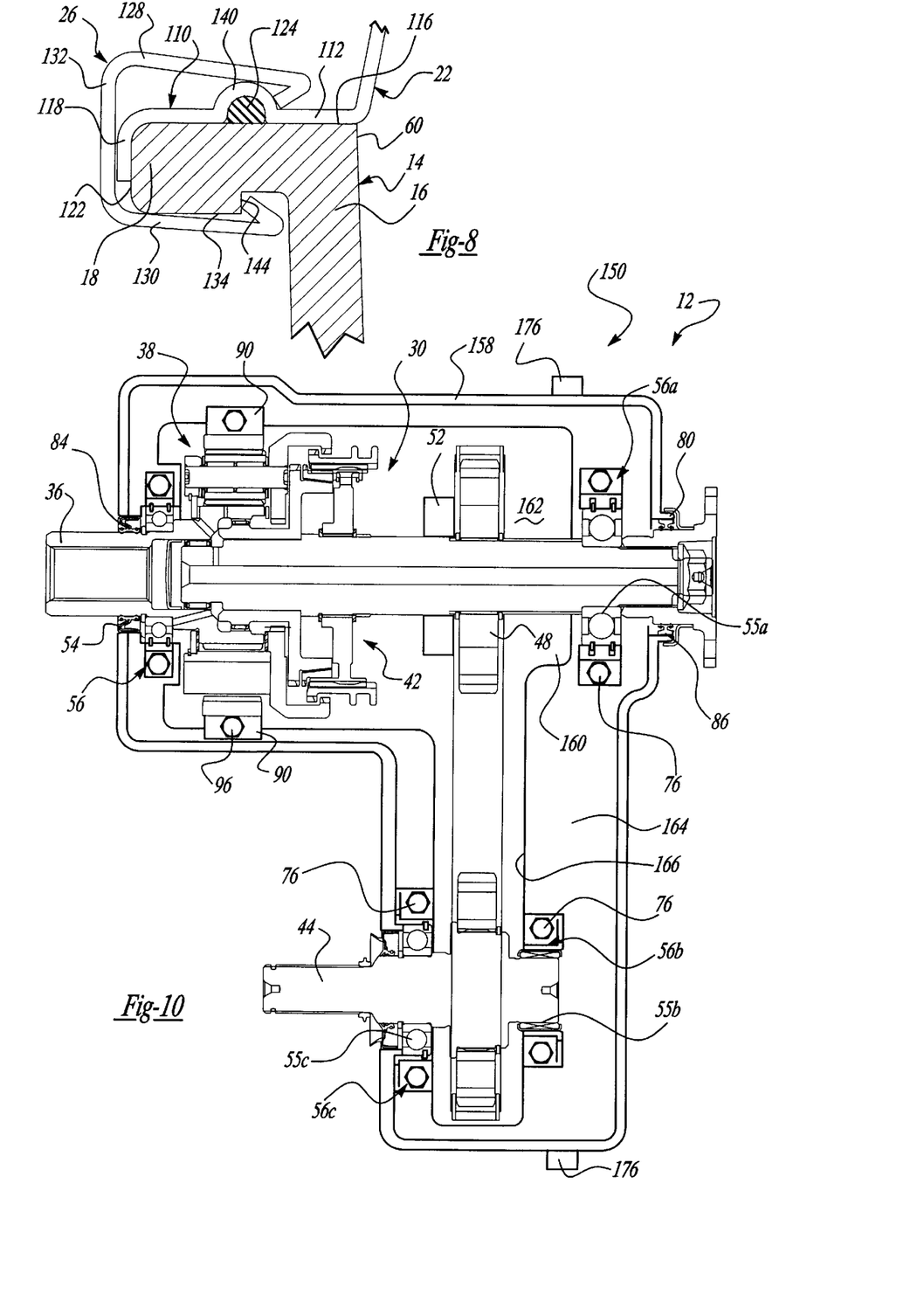
FIG. 8 is a partial sectional view showing an alternative spring clamp attachment arrangement.
FIG. 10 is a sectional view of FIG. 9.

As an alternative to the spring clamp arrangement shown in FIG. 7, FIG. 8 illustrating a modified arrangement wherein groove 126 in rim 18 is eliminated and seal element 124 is retained in the groove defined by projection 140 in first segment 112 of flange 110. While spring clamps 26 are shown to be U-shaped, it should be appreciated that spring clamps 26 may be adapted to any shape that can compressingly secure cover plate 22 to flange 18. The U-shaped spring clamps 26 are spaced around the connection of cover plate 22 and flange 18 to achieve a relatively constant sealing load therebetween. Preferably, spring clamps 26 are made of a material capable of resisting corrosion and thermocycling. It is anticipated that spring clamps 26 will be installed/removed using an assembly tool.

According to an alternative embodiment of the present invention shown in FIGS. 9 through 12, the power transfer device is shown as a transfer case 12' having a modular housing assembly 150 which supports geartrain 30. As seen, common reference numerals are used to identify components similar to those previously described in association with housing assembly 10. Modular housing assembly 150 includes a box-like case 152 and a cover plate 154 secured to case 152 using a plurality of spring clamps 26. Box-like case 152 includes a continuous sidewall portion 158 having a continuous peripheral rim 159, and an integral base portion 160 which define an interior chamber 162 within which geartrain 30 is mounted. Geartrain 30 and the lubricating fluid are enclosed and sealed in interior chamber 162 by cover plate 154. Similar to cover plates 22 and 24 of the first embodiment, cover plate 154 is mounted and sealed relative to rim 159 for controlling noise, vibration, and harshness without the loads of geartrain 30 being transferred thereto. Using spring clamps 26, a system similar to that disclosed in FIGS. 7 and 8 is used to seal and secure cover plate 154 to rim 159 of case 152.

Figure 9:
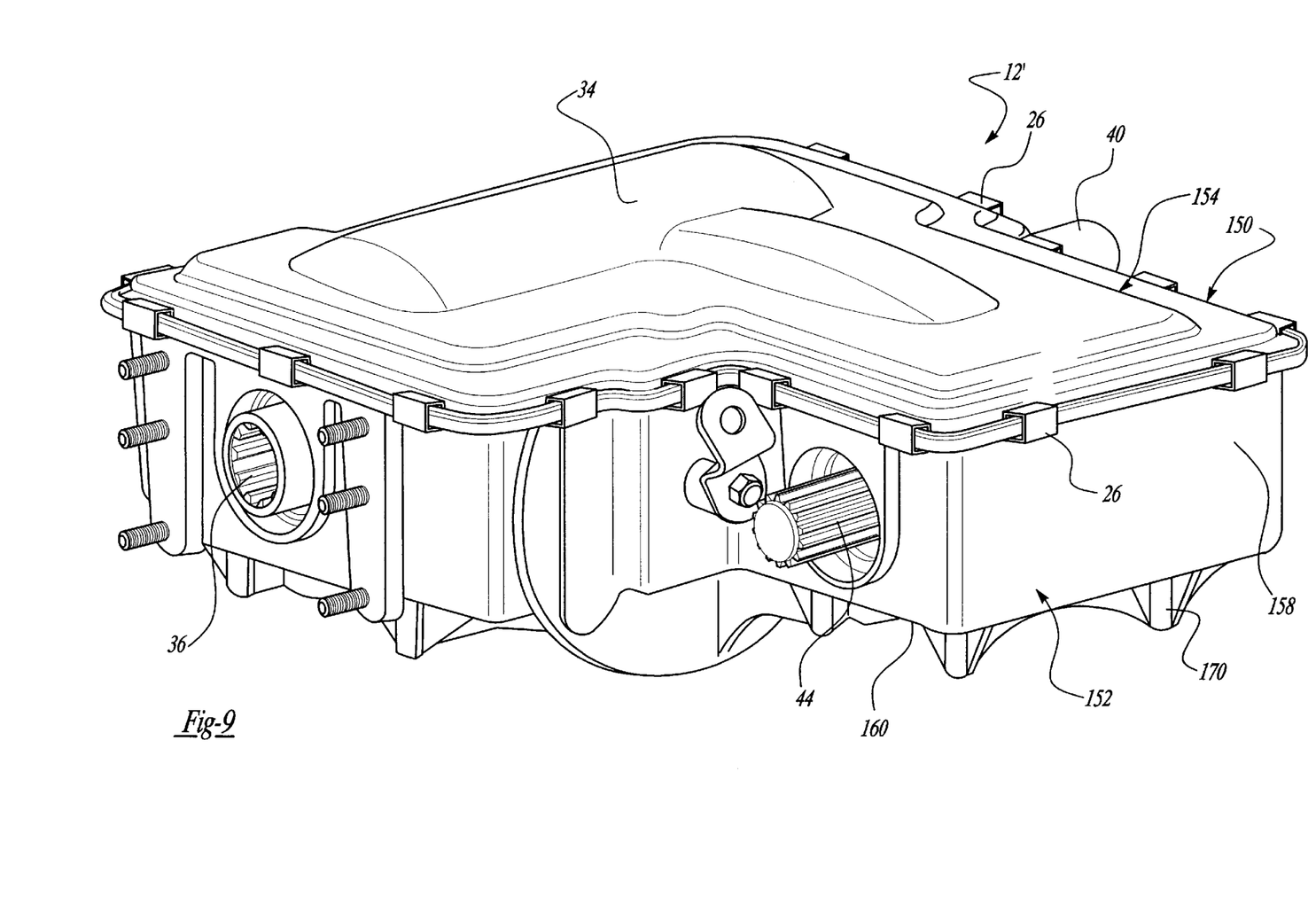
FIG. 9 is a perspective view of an exemplary power transfer device having a modular housing assembly according to alternative embodiment of the present invention.
Figure 11:
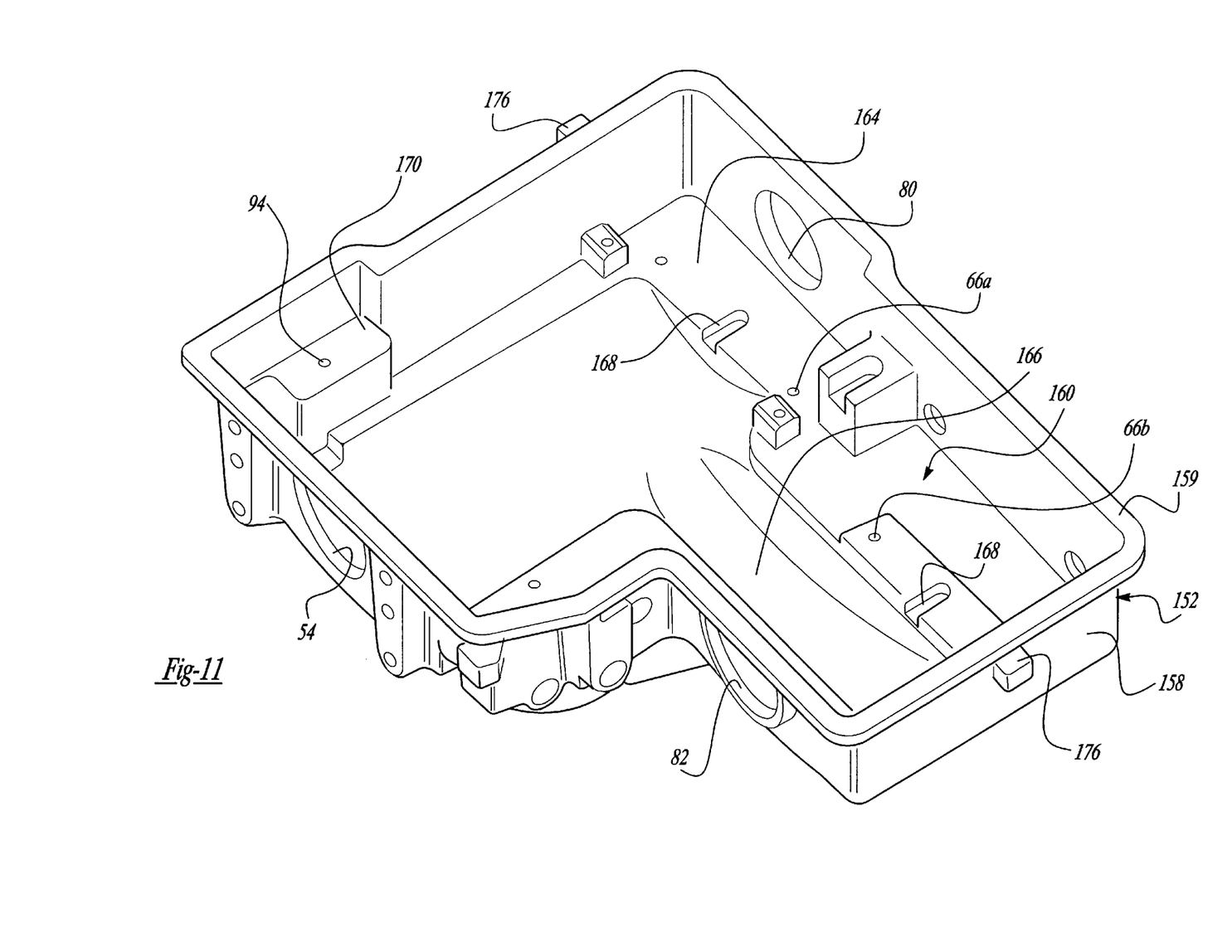
FIGS. 11 and 12 are pictorial views of the box-like case associated with the modular housing assembly of FIG. 9.
Figure 12:
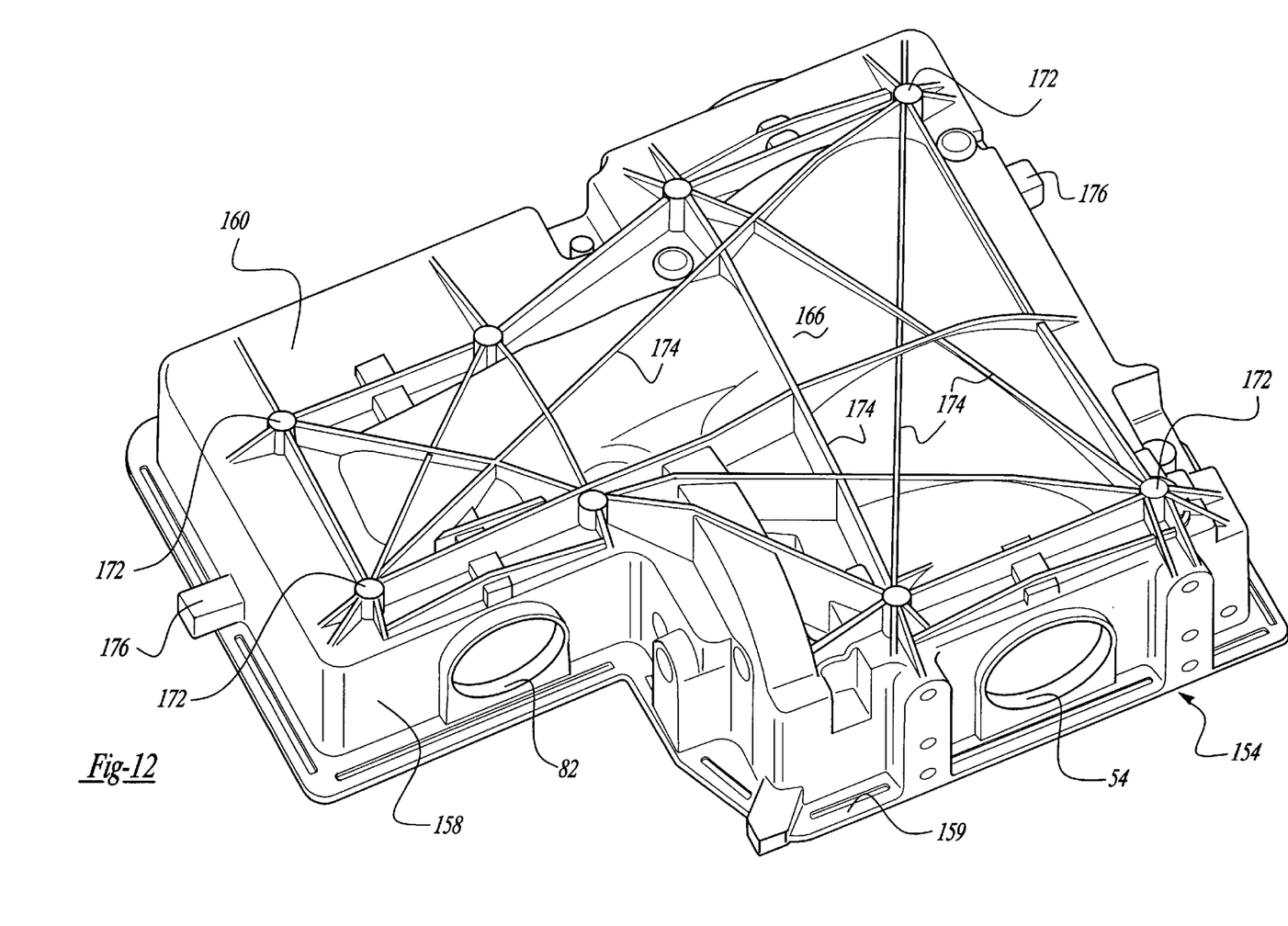

With particular reference to FIGS. 9 and 10, base portion 160 of case 152 is shown to include a continuous shelf segment 164 formed adjacent to sidewall portion 158, and a central recessed segment 166. Preferably, shelf segment 164 is formed in a plane which is orthogonal to sidewall portion 158. Recessed segment 166 is sized to provide the required clearances for all rotary components of geartrain 30, while shelf segment 164 is adapted to permit pillow blocks to be aligned and mounted thereto. For example, pillow blocks 56, 56a, 56b and 56c are adapted to be fixed to shelf segment 164 via threaded fasteners 76 driven through aligned sets of mounting apertures and threaded bores. As seen, keyways 168 provide alignment for the pillow blocks. Likewise, a trunion 170 is provided for mounting ring gear 89 to case 152 via mounting bracket 90. Trunion 170 is representative of others that are provided for mounting components at a level above shelf segment 164.

To provide sufficient structure to accept fasteners 76, each threaded bore formed in shelf segment 164 is reinforced in a boss 172 which extends outwardly from base portion 160. As best seen from FIG. 12, a series of reenforcement rails 174 crisscross the outer surface of recessed segment 166 to provide additional rigidity. One or more sets of machining lugs 176 extend from case 152 and are used for accurately fixturing case 152 during machining operations.

As can be appreciated from the foregoing, the time and cost required to manufacture new housings for different design variations in power transfer devices can be significantly reduced by the present invention. A common center case 14 can be fabricated for use with an entire family of power transfer devices with different cover plates being the only possible requirement. Additional advantages, such as reduced case resonance and improved testing capability, can be realized employing the above invention. Moreover, the entire geartrain can be visually inspected and tested by "spinning" the drive components while the cover plate(s) are removed. Furthermore, the invention as described above provides improved lubrication in the assembly in that the bearings, seals, and bushings are open to splash lubrication methods with the pillow blocks.

The invention being thus described, it will be obvious that the same may be varied in many ways. In particular, the various embodiments of the modular housing assembly described herein can be used to support the drive components of any power transmission assembly of the type used in motor vehicles, off-road vehicles, press drives and the like. Such variations are not to be regarded as a departure from the spirit and scope of the invention, and all such modifications as would be obvious to one skilled in the art are intended to be included within the scope of the following claims.

What is claimed is:

1. A modular housing assembly for use with a power transfer device to support a geartrain, said housing assembly comprising:
   a case having a continuous sidewall defining an open interior volume and a terminal edge, and a shelf cantilevered from said sidewall so as to be supported only at one end and to extend into said open interior volume and having a mounting surface adapted to support a component of the geartrain thereon; and
   a cover plate secured to said terminal edge of said sidewall.

2. The housing assembly of claim 1 wherein said case has a plurality of shelves with said mounting surface for each of said shelves aligned on a common plane.

3. A modular housing assembly for use with a power transfer device to support a geartrain, said housing assembly comprising:
   a case having a continuous sidewall defining an open interior volume, and a shelf extending into said open interior volume for supporting the geartrain thereon;
   said sidewall defining first and second terminal edges such that a first cover plate is secured to said first terminal edge and a second cover plate is secured to said second terminal edge for enclosing said interior volume to define an interior chamber.

4. The housing assembly of claim 3 wherein said case further includes a first rim extending outwardly from said first terminal edge of said sidewall and a second rim extending outwardly from said second terminal edge of said sidewall, and wherein said first cover plate includes a first peripheral flange which matingly engages said first rim and said second cover plate includes a second peripheral flange which matingly engages said second rim.

5. The housing assembly of claim 4 wherein fasteners are used to secure said first flange of said case to said first rim of said first cover plate and to secure said second flange of said case to said second rim of said second cover plate.

6. The housing assembly of claim 5 wherein said fasteners are spring clamps each having a first segment acting on said flange and a second segment acting on said rim to exert a clamping force therebetween.

7. The housing assembly of claim 3 further comprising a first seal disposed between said first cover plate and said first terminal edge and a second seal disposed between said second cover plate and said second terminal edge.

8. A modular housing assembly for use with a power transfer device to support a geartrain, said housing assembly comprising:
   a case having a continuous sidewall defining an open interior volume and a terminal edge, and a shelf extending into said open interior volume for supporting the geartrain thereon;
   a cover plate secured to said terminal edge of said sidewall; and
   said sidewall including first and second apertures completely contained in said sidewall such that said first aperture is adapted to receive a first rotary component of the geartrain and said second aperture is adapted to receive a second rotary component of the geartrain.

9. A modular housing assembly for use with a power transfer device to support a geartrain, said housing assembly comprising:
   a case having a continuous sidewall defining an open interior volume and a terminal edge, and a shelf extending into said open interior volume for supporting the geartrain thereon, said case including a peripheral rim extending outwardly from said terminal edge of said sidewall;
   a cover plate secured to said terminal edge of said sidewall, said cover plate including a peripheral flange which matingly engages said peripheral rim; and
   a plurality of spring clamps each having a first segment acting on said flange and a second segment acting on said rim to exert a clamping force therebetween.

10. A modular housing assembly for use with a power transfer device to support a geartrain, said housing assembly comprising:
    a case having a continuous sidewall defining an open interior volume and a terminal edge, and a shelf extending into said open interior volume for supporting the geartrain thereon;
    a cover plate secured to said terminal edge of said sidewall; and
    said case including a base portion defining said shelf and a recessed segment, said shelf is continuous alone the entire sidewall and includes bosses to receive fasteners for mounting load bearing members to said shelf.

11. A power transfer device comprising:
    a geartrain;
    a case having a continuous sidewall defining an interior volume and being open on its opposing sides to define upper and lower terminal edges, said case having a plurality of shelf members extending from an interior of said continuous sidewall into said interior volume, said shelf members supporting said geartrain; and upper and lower cover plates secured to said upper and lower terminal edges of said sidewall to enclose said interior volume and define an internal chamber.

12. The power transfer device of claim 11 wherein said case further includes an upper peripheral rim extending outwardly from said upper terminal edge of said sidewall and a lower peripheral rim extending outwardly from said lower terminal edge of said sidewall, said upper cover plate engaging said upper rim and said lower cover plate engaging said lower rim, and wherein fasteners are used to secure said upper and lower cover plates to said corresponding upper and lower rims of said case.

13. The power transfer device of claim 12 wherein said fasteners are spring clamps each having a first segment acting on said flange and a segment acting on said rim to exert a clamping force therebetween.

14. The power transfer device of claim 12 wherein said upper and lower rims each have a groove in which a seal element is disposed, said fasteners acting to compress said seal element between said cover plates and said rims to seal said internal chamber.

15. The power transfer device of claim 12 wherein said upper and lower cover plates each include a groove containing a seal element, whereby said fasteners compress said seal elements between said cover plates and said rims to seal said internal chamber.

16. The power transfer device of claim 11 further comprising support members mounted to said shelf members for supporting components of said geartrain.

17. The power transfer device of claim 11 wherein said shelf members each have a planar mounting surface aligned in a common plane.

18. A housing assembly for supporting a geartrain in a power transfer device, comprising:

a case having a continuous sidewall defining a substantially open interior area and at least one terminal edge having an outwardly extending rim;

a shelf member cantilevered from said sidewall so as to be supported only at one end and extending into said open interior area and having a mounting surface adapted to support a component of the geartrain;

a support block mounted to said shelf member and adapted for supporting a component of the geartrain;

a cover plate mounted on said rim for enclosing said open interior area; and fasteners for securing said cover plate to said rim of said sidewall.

19. The housing assembly of claim 18 wherein said sidewall defines first and second terminal edges such that a first cover plate is secured to said first terminal edge and a second cover plate is secured to said second terminal edge for enclosing an interior volume to define an interior chamber.

20. The housing assembly of claim 19 wherein said case further includes a first rim extending outwardly from said first terminal edge of said sidewall and a second rim extending outwardly from said second terminal edge of said sidewall, and wherein said first cover plate includes a first peripheral flange which matingly engages said first rim and said second cover plate includes a second peripheral flange which matingly engages said second rim.

21. The housing assembly of claim 20 wherein said fasteners are spring clamps each having a first segment acting on one of said first and second flanges and a second segment acting on a corresponding one of said first and second rims to exert a clamping force therebetween.

22. The housing assembly of claim 18 wherein said case has a plurality of said shelf members and said mounting surface for each of said shelf members is aligned on a common plane.

23. A housing assembly for supporting a geartrain in a power transfer device, comprising:

a case having a continuous sidewall defining a substantially open interior area and at least one terminal edge having an outwardly extending rim;

a shelf member extending from said sidewall into said open interior area and adapted for supporting a component of the geartrain;

a cover plate mounted on said rim for enclosing said open interior area; and a plurality of spring clamps each having a first segment acting on a flange of said case and a second segment acting on a rim of said cover plate to exert a clamping force therebetween.

24. A power transfer device for a motor vehicle comprising a casing having a base and a continuous sidewall defining an interior chamber and an opening, said casing having a rim formed along an edge of said opening and a continuous shelf member extending into said chamber along the entire sidewall of said casing;

a geartrain mounted on said shelf member; and a cover plate attachable to said rim to enclose said opening and seal said chamber.

25. The power transfer device of claim 24 further comprising load bearing members mounted to said shelf member and supporting components of said geartrain.

26. The power transfer device of claim 24 wherein said cover plate is secured to said rim via a plurality of clamps.

27. The power transfer device of claim 26 wherein said rim includes a groove containing a sealing material, whereby said clamps compress said sealing material for sealing said interior chamber of said casing.

28. The power transfer device of claim 26 wherein said cover plate includes a groove containing a sealing material, whereby said clamps compress said sealing material for sealing said interior chamber of said casing.

29. A power transfer device for use in the driveline of a motor vehicle, comprising:

a case having a continuous sidewall defining an interior chamber and which is open along its opposite terminal edges to define first and second openings, said case including first and second apertures formed through and completely contained in said sidewall and first and second shelf members extending from said sidewall into said interior chamber;

a first mounting device secured to said first shelf member;

a second mounting device secured to said second shelf member;

a first shaft extending through said first aperture in said sidewall and which is rotatably supported by said first mounting device;

a second shaft extending through said second aperture in said sidewall and which is rotatably supported by said second mounting device;

a first cover plate secured to one terminal edge of said sidewall to enclose said first opening; and a second cover plate secured to the other terminal edge of said sidewall to enclose said second opening.

30. The power transfer device of claim 29 further comprising fasteners for securing said first and second cover plates to said case.

31. The power transfer device of claim 30 wherein said fasteners are spring clamps.

32. The power transfer device of claim 29 wherein said first and second shelf members each have a mounting surface aligned in a common plane.

33. The power transfer device of claim 29 wherein said first mounting device includes a pillow block secured to said first shelf member and a bearing assembly mounted to said pillow block, said first shaft being rotatably supported by said bearing assembly.

34. A transfer case for use in a driveline of a four-wheel drive vehicle, comprising:

a case having a sidewall and a base defining an interior chamber, said sidewall is open along its terminal edge to define an opening, said case including first, second and third apertures formed through and completely contained in said sidewall;

a first mounting device secured to a first shelf portion of said case;

a second mounting device secured to a second shelf portion of said case;

a third mounting device secured to a third shelf portion of said case;

an input shaft extending through said first aperture in said sidewall and which is rotatably supported by said first mounting device;

a first output shaft extending through said second aperture in said sidewall and which is rotatably supported by said second mounting device;

a second output shaft extending through said third aperture in said sidewall and which is rotatably supported by said third mounting device; and a cover plate secured to said terminal edge of said sidewall to enclose said opening.

35. The transfer case of claim 34 further comprising fasteners for securing said cover plate to said case.

36. The transfer case of claim 35 wherein said fasteners are spring clamps.

37. The transfer case of claim 34 wherein said first, second, and third shelf portions have a planar mounting surface.

38. The transfer case of claim 34 wherein said first mounting device includes a pillow block secured to said first shelf portion, and a bearing assembly mounted to said pillow block, said input shaft being rotatably supported by said bearing assembly.

39. A transfer case for use in a driveline of a four-wheel drive vehicle, comprising:

a case having a sidewall and a base defining an interior chamber, said sidewall is open along its terminal edge to define an opening, said case including first, second and third openings formed through said sidewall;

a first pillow block secured to a first shelf portion which extends into an interior chamber of said case;

a second pillow block secured to a second shelf portion which extends into an interior chamber of said case;

a third pillow block secured to a third shelf portion which extends into an interior chamber of said case;

an input member extending through said first opening in said sidewall and which is rotatably supported by said first pillow block;

a first output member extending through said second opening in said sidewall and which is rotatably supported by said second pillow block;

a second output member extending through said third opening in said sidewall and which is rotatably supported by said third pillow block;

a cover plate secured to said terminal edge of said sidewall to enclose said opening; and said first, second, and third pillow blocks each include a shaft supporting portion and a mounting portion connected to said shaft supporting portion, said mounting portion of said first, second, and third pillow blocks being mounted to said first, second, and third shelf portions, respectively.

* * * * *